(12) United States Patent  
Eglin et al.

(10) Patent No.: US 7,944,853 B2  
(45) Date of Patent: May 17, 2011

(54) VIRTUAL ROOT BRIDGE

(75) Inventors: Matthew George Eglin, Ottawa (CA); Jeff Joslin, Kanata (CA); Stephen Rayment, Kanata (CA)

(73) Assignee: Belair Networks Inc. (CA)

( * ) Notice: Subject to any disclaimer, the term of this patent is extended or adjusted under 35 U.S.C. 154(b) by 840 days.

(21) Appl. No.: 11/326,391

(22) Filed: Jan. 6, 2006

(65) Prior Publication Data

US 2007/0159983 A1    Jul. 12, 2007

(51) Int. Cl.
*H04L 12/28* (2006.01)

(52) U.S. Cl. .......................... 370/254; 370/338; 370/255

(58) Field of Classification Search .................. 370/256, 370/254, 401, 338, 400, 408, 474, 255
See application file for complete search history.

(56) References Cited

U.S. PATENT DOCUMENTS

| | | | |
|---|---|---|---|
| 5,570,466 | A | 10/1996 | Oechsle |
| 6,003,137 | A | 12/1999 | Kawasaki |
| 6,023,563 | A | 2/2000 | Shani |
| 6,411,625 | B1 | 6/2002 | Furuhashi et al. |
| 6,603,740 | B1 | 8/2003 | Du |
| 6,650,648 | B1 | 11/2003 | Du |
| 6,765,881 | B1 | 7/2004 | Rajakarunanayake |
| 6,785,513 | B1* | 8/2004 | Sivaprakasam .............. 455/63.1 |
| 6,788,650 | B2* | 9/2004 | Chen et al. ..................... 370/254 |
| 6,839,541 | B2 | 1/2005 | Alzoubi et al. |
| 6,857,027 | B1 | 2/2005 | Lindeborg et al. |
| 7,324,461 | B2* | 1/2008 | Rouyer et al. ................ 370/254 |
| 7,480,292 | B2* | 1/2009 | Busi et al. ...................... 370/389 |
| 2003/0126429 | A1* | 7/2003 | Jinmei et al. ................... 713/153 |
| 2004/0062209 | A1 | 4/2004 | Goldman et al. |
| 2004/0160904 | A1 | 8/2004 | Enomoto et al. |
| 2004/0225725 | A1 | 11/2004 | Enomoto et al. |
| 2004/0252634 | A1* | 12/2004 | Regan et al. ................... 370/216 |
| 2005/0138008 | A1 | 6/2005 | Tsillas |
| 2005/0201272 | A1* | 9/2005 | Wang et al. .................... 370/216 |
| 2005/0220077 | A1 | 10/2005 | Vereecke et al. |
| 2006/0002292 | A1* | 1/2006 | Chang et al. ................... 370/225 |
| 2006/0007939 | A1* | 1/2006 | Elangovan ............... 370/395.53 |
| 2006/0198349 | A1* | 9/2006 | Ng et al. ........................ 370/338 |
| 2008/0189353 | A1* | 8/2008 | Gray et al. ..................... 709/202 |

OTHER PUBLICATIONS

International Search Report for PCT/CA2007/000012.
Written Opinion of the International Searching Authority for PCT/CA2007/000012.

* cited by examiner

*Primary Examiner* — Man Phan
*Assistant Examiner* — Nourali Mansoury
(74) *Attorney, Agent, or Firm* — Katten Muchin Rosenman LLP (57) ABSTRACT

A network includes a plurality of network clusters. Each network cluster includes a plurality of nodes. At least one of the plurality of nodes includes a portal node. A portal node is a node with at least one link that crosses a boundary of the network cluster. Each portal node is configured to communicate detection packets for detecting the existence of other portal nodes within the network cluster. Each portal node is configured to communicate with nodes within the network cluster associated with the respective portal node to indicate that the respective portal node is a predetermined number of hops away from a virtual root bridge associated with the network cluster.

38 Claims, 5 Drawing Sheets

| | Field | Value | Octet |
|---|---|---|---|
| 410 | Destination MAC Address | 01:0d:67:00:00:00 | 1<br>2<br>3<br>4<br>5<br>6 |
| 415 | Source MAC Address | nn:nn:nn:nn:nn:nn | 7<br>8<br>9<br>10<br>11<br>12 |
| 420 | Ethertype | 88:b7 | 13<br>14 |
| 435 | Protocol Identifier | 00:0d:67:00:00 | 15<br>16<br>17<br>18<br>19 |
| 440 | RSTP Instance Identifier | 0x0nnn | 20<br>21 |
| 445 | VRBP Version Number | 0x00 | 22 |
| 450 | Instance MAC Address | nn:nn:nn:nn:nn:nn | 23<br>24<br>25<br>26<br>27<br>28 |
| 455 | Max Age | 0xnnnn | 29<br>30 |
| 460 | Hello Time | 0xnnnn | 31<br>32 |
| 465 | Forward Delay | 0xnnnn | 33<br>34 |
| 470 | Hop Count | 0xnn | 35 |

405 — 802.3 Header (covers 410, 415, 420)
430 — Payload
400

VIRTUAL ROOT BRIDGE

BACKGROUND

1. Field of the Invention

The present invention relates to networks and network topologies. More particularly, the present invention relates to a network and a network protocol, referred to herein as the "virtual root bridge (VRBP) protocol," that can support redundant links between two or more network clusters or instances of the network.

2. Background Information

A multipoint-to-multipoint ("M2M") network is an alternative architecture that can trade off lower performance for lower cost as compared to, for example, the point-to-point ("P2P") architecture that can used in networks. As compared to a P2P network, a M2M network includes characteristics such as, for example, the following: links are not pre-configured; links are dynamic rather than static; and links are less reliable. Due to such characteristics, the best choice of path through the M2M network may change more often. Additionally, it is possible that portions of the network can become, for a time, isolated from the rest of the network. Furthermore, the cluster size (i.e., the number of nodes with M2M links to other nodes in the cluster) is inherently limited to approximately eight nodes. The M2M architecture can support various types of network topologies, such as, for example, wireless mesh networks.

Figure 1:
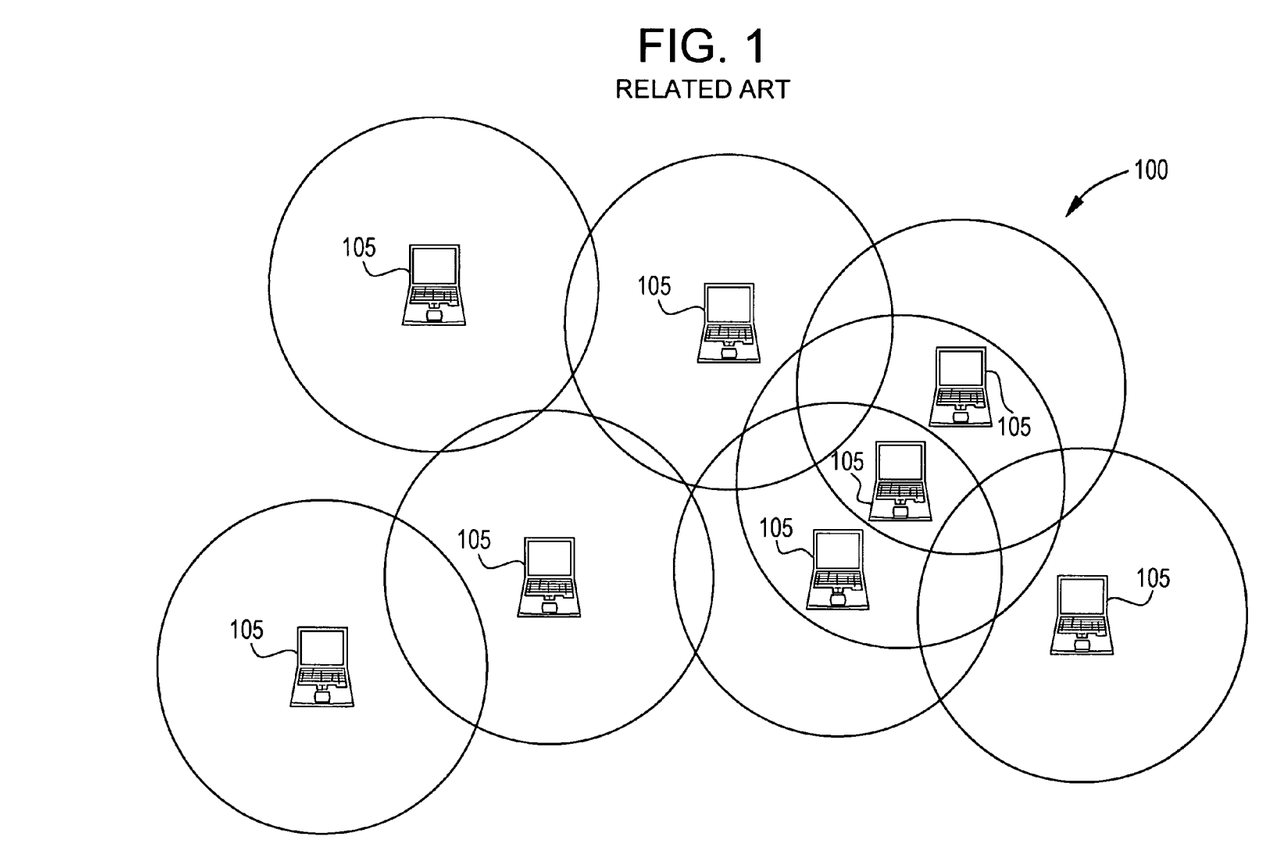
FIG. 1 is a diagram illustrating an ad hoc wireless mesh network in which client devices form the mesh.

FIG. 1 is a diagram illustrating an ad hoc wireless mesh network 100 in which the client devices 105 form the mesh. An ad hoc mesh network is a wireless mesh network created when multiple wireless client devices 105 each act as a router (either at Layer 2 or at Layer 3) to transport traffic destined to or from another wireless client device 105. In such a network, there are no access points (APs) and no hierarchy. There may or may not be a connection to an external network. It should be noted that conventional mesh network topologies generally assumes there is no such connection to an external network, even though such a network may be of limited usefulness.

Figure 2:
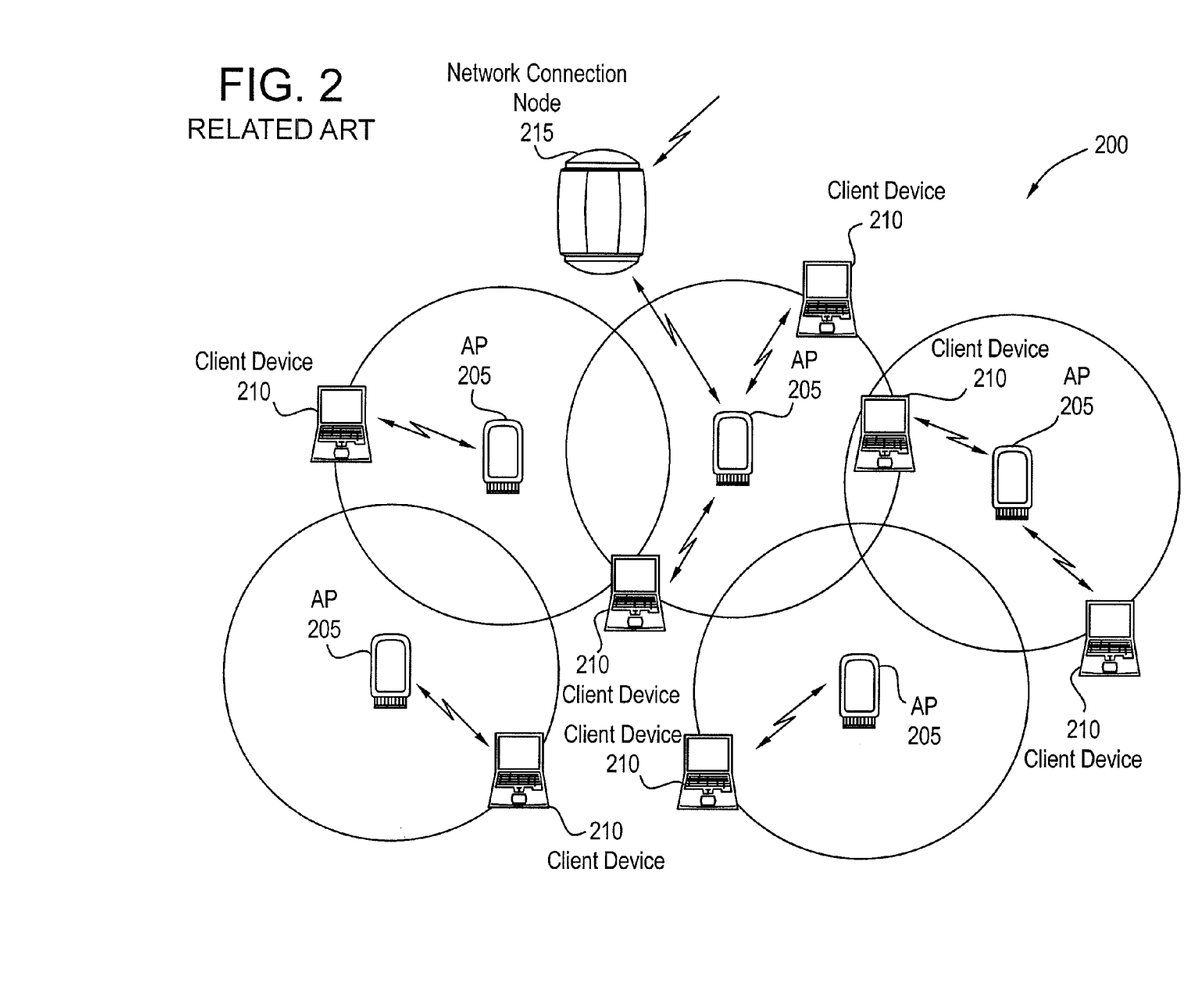
FIG. 2 is a diagram illustrating an infrastructure mesh network that includes Access Points and client devices, and communicates with external networks using a network connection node.

FIG. 2 is a diagram illustrating an infrastructure mesh network 200 that includes APs 205 and client devices 210, and communicates with external networks using a network connection node 215. Infrastructure mesh networks comprise APs ("nodes") 205 that are interconnected wirelessly. The wireless connections generally use the same radios used to connect to the client devices 210. Infrastructure mesh networks are somewhat hierarchical in that a mesh cluster—a group of nodes 205 connected sharing a mesh—is connected to an upstream network (e.g., via network connection node 215) that may be itself a mesh cluster. Infrastructure mesh networks are generally more static than ad hoc mesh networks, and the client devices 205 do not participate in the mesh. Ideally, the client devices 205 use the same configuration as would be used to connect to a conventional wireless network. In contrast, any client in an ad hoc mesh network runs special mesh networking software.

To select paths through the network for purposes of, for example, communicating data and passing data traffic, the Rapid Spanning Tree Protocol (RSTP) can be used. RSTP is described in the I.E.E.E. 802.1w standard, the entire contents of which is incorporated by reference herein. RSTP is an evolution of the Spanning Tree Protocol ("STP," described in the I.E.E.E. 802.1D-1998 standard, the entire contents of which is incorporated by reference herein) and provides for a faster spanning tree convergence after a topology change. In other words, RSTP is an I.E.E.E.-standard protocol that dynamically disables links in an Ethernet LAN to create a loop-free spanning tree (i.e., a collection of links that provide connectivity between any pair of nodes in the tree) that uses normal bridge forwarding. Any network using bridge forwarding cannot have active loops, because broadcast and multicast frames can circulate substantially forever around such a loop. RSTP works by selectively disabling links to create a loop-free spanning tree (i.e., a collection of links that provide connectivity between any pair of nodes in the tree).

One factor limiting the size of an RSTP network is the aging of root bridge information. There is a limit on the maximum number of hops between the RSTP root bridge and any other bridge within that RSTP network. The root bridge can be determined by which bridge has the numerically lowest bridge priority value. In case of a tie, the bridge with the numerically lowest MAC address can be selected. Information on the root bridge expires after a period of time defined by the MaxAge parameter. Under normal operation, the information propagates one hop every HelloTime interval. In other words, any information on the root bridge that is older than the MaxAge parameter must be discarded. Root-bridge information is propagated in Bridge Protocol Data Units (BPDUs) that are generally sent every HelloTime seconds. The resulting limit on the network diameter is given by Equation (1):

$$MaxHops \leq \frac{MaxAge}{HelloTime} - 1. \quad (1)$$

For example, for (default) values of HelloTime=2 seconds and MaxAge=20 seconds, MaxHops≦9. Such a limit is observed for any reasonable combination of link and node failures. The I.E.E.E. recommended hop limit for the base network (i.e., a network with no link or node failure) is seven. However, a wireless mesh network can require a lower hop limit, because the links are inherently less reliable than conventional wired links.

With MaxHops≦9, such a result generally means that there can be no more than nine hops from any one node to any other node. The root bridge and backup root bridge should be located near the center of the network topology, so that no node is normally more than approximately five hops away from the root bridge. With conventional network topologies, the maximum number of hops should not exceed such a limit even if one or two links fail, or the root bridge fails. (With a loop topology, the number of nodes in the loop, plus the number of hops to the root bridge if it is not in the loop, must not exceed nine.) The exact constraint on mesh network size depends on such factors as, for example the topology and how reliable the network needs to be. In other words, there is an interaction between the desired network reliability and the maximum network size. If the network is required to be extremely reliable, then it becomes necessary to allow for more unlikely failure scenarios where multiple links or nodes fail simultaneously. Such a scenario implies that the hop limit for the base network would be lower, which can severely limit the maximum allowable network size. In sum, conventional RSTP is not a complete solution for determining paths through a large mesh network, because of scalability limits.

Some mesh networking algorithms can be used to partition a hierarchical network in order to overcome scaling limitations of the algorithm. For example, the Ad-hoc On-demand Distance Vector ("AODV") protocol could be run within each sector of the network, while a separate instance of AODV could be used to provide forwarding in the rest of the aggregation network. However, RSTP does not easily support such a type of partitioning. If there are redundant links between RSTP instances, then loops will exist that will not be detected by RSTP.

Therefore, there is a need for a network topology and networking protocol than can support scalability and partitioning in networks, such as, for example, mesh networks and the like, that use path selection algorithms such as, for example, RSTP or the like.

SUMMARY OF THE INVENTION

A system and method are disclosed for networking. In accordance with exemplary embodiments of the present invention, according to a first aspect, a network includes a plurality of network clusters. Each network cluster includes a plurality of nodes. At least one of the plurality of nodes comprises a portal node. A portal node comprises a node with at least one link that crosses a boundary of the network cluster. Each portal node is configured to communicate detection packets for detecting an existence of other portal nodes within the network cluster. Each portal node is configured to communicate with nodes within the network cluster associated with the respective portal node to indicate that the respective portal node is a predetermined number of hops away from a virtual root bridge associated with the network cluster.

According to the first aspect, the network cluster can comprise at least two portal nodes, and each of the at least two portal nodes can comprise at least one link with a second network cluster. When the portal node comprises at least two links that cross the boundary of the network cluster, the portal node can be configured to select one of the at least two links as an active link for communicating detection packets. Nodes within the network cluster other than the portal nodes can be configured to utilize Rapid Spanning Tree Protocol (RSTP) or the like. However, the RSTP is not utilized by each portal node for the at least one link. Each portal node can be configured to communicate detection packets on each interface of the portal node that is not part of the network cluster to which the portal node belongs. Each portal node can be configured to discard information packets received via the at least one link when the information packets do not comprise detection packets.

According to the first aspect, the detection packet can comprise a Virtual Root Bridge Protocol (VRBP) frame. Nodes other than the portal nodes can be configured to process the VRBP frames as broadcast or multicast packets. The VRBP frame can comprise frame identity information configured to identify the detection packet as the VRBP frame. The VRBP frame can comprise network cluster identity information configured to identify the network cluster of the portal node transmitting the VRBP frame. The portal node receiving the VRBP frame can utilize the network cluster identity information to determine whether the VRBP frame corresponds to the network cluster to which the portal node receiving the VRBP frame belongs. Network cluster identity information can be configured to identify a RSTP instance of the portal node transmitting the VRBP frame. The VRBP frame can comprise version information configured to identify a version of the VRBP. The version information can comprise a major version number and a minor version number. The portal node receiving the VRBP frame can be configured to discard the VRBP frame when the major version number contained in the VRBP frame does not match the major version number of the VRBP utilized by the portal node receiving the VRBP frame.

According to the first aspect, the VRBP frame can comprise virtual root bridge parameter information configured to specify virtual root bridge parameters associated with the portal node transmitting the VRBP frame. The VRBP frame can comprise address information configured to identify an interface on the portal node transmitting the VRBP frame. The portal nodes within a network cluster can be configured to mutually agree upon the virtual root bridge parameters to be used by the portal nodes within the network cluster. The virtual root bridge parameters contained in the VRBP frame having a lowest value of the address information can be used by the portal nodes within the network cluster. The VRBP frame can comprise time length information configured to specify a length of time between transmission of VRBP frames. According to an exemplary embodiment of the first aspect, each network cluster can comprise a RSTP instance. The network can comprise a mesh network, such as, for example, a wireless mesh network or the like.

According to a second aspect of the present invention, a plurality of mesh networks can be arranged in a hierarchical configuration to form a hierarchical mesh network. Each mesh network includes a plurality of network clusters. Each network cluster includes a plurality of nodes. At least one of the plurality of nodes comprises a portal node. A portal node comprises a node with at least one link that crosses a boundary of the network cluster. Each portal node is configured to communicate detection packets for detecting an existence of other portal nodes within the network cluster. Each portal node is configured to communicate with nodes within the network cluster associated with the respective portal node to indicate that the respective portal node is a predetermined number of hops away from a virtual root bridge associated with the network cluster.

According to the second aspect, each network cluster can comprise a RSTP instance. Each portal node can be configured to discard information packets received via the at least one link when the information packets do not comprise detection packets. Information packets other than detection packets are not transmitted on the at least one link. The at least one link can be configured as an edge port. The detection packet can comprise a VRBP frame.

According to a third aspect of the present invention, a VRBP data structure for detection packets, in which the VRBP data structure is embodied in a computer-readable medium, comprises version information configured to identify a version of the VRBP. The VRBP data structure includes frame identity information configured to identify the detection packet as a VRBP frame. The VRBP data structure includes network cluster identity information configured to identify a network cluster of a portal node transmitting the VRBP frame. A portal node receiving the VRBP frame utilizes the network cluster identity information to determine whether the VRBP frame corresponds to the network cluster to which the portal node receiving the VRBP frame belongs. The VRBP data structure includes virtual root bridge parameter information configured to specify virtual root bridge parameters associated with the portal node transmitting the VRBP frame.

According to the third aspect, the network cluster identity information is configured to identify a RSTP instance of the portal node transmitting the VRBP frame. The version information can comprise a major version number and a minor version number. The portal node receiving the VRBP frame can be configured to discard the VRBP frame when the major version number contained in the VRBP frame does not match the major version number of the VRBP utilized by the portal node receiving the VRBP frame. The VRBP data structure can include address information configured to identify an interface on the portal node transmitting the VRBP frame. Portal nodes within a network cluster can be configured to mutually agree upon the virtual root bridge parameters to be used by the portal nodes within the network cluster. The virtual root bridge parameters contained in the VRBP frame having a lowest value of the address information can be used by the portal nodes within the network cluster. The VRBP data structure can include time length information configured to specify a length of time between transmission of VRBP frames.

According to a fourth aspect of the present invention, a method of networking includes the steps of: a.) arranging a plurality of network clusters, wherein each network cluster includes a plurality of nodes, wherein at least one of the plurality of nodes comprises a portal node, and wherein a portal node comprises a node with at least one link that crosses a boundary of the network cluster; b.) communicating detection packets from each portal node to detect an existence of other portal nodes within the network cluster; and c.) communicating from each portal node to nodes within the network cluster associated with the respective portal node to indicate that the respective portal node is a predetermined number of hops away from a virtual root bridge associated with the network cluster.

According to the fourth aspect, the network cluster can include at least two portal nodes, and each of the at least two portal nodes can include at least one link with a second network cluster. The method can include the step of: d.) selecting one of at least two links as an active link for communicating detection packets, when the portal node includes at least two links that cross the boundary of the network cluster. Nodes within the network cluster other than the portal nodes can be configured to utilize RSTP or the like. However, the RSTP is not utilized by each portal node for the at least one link. The method can include steps of: e.) communicating detection packets on each interface of the portal node that is not part of the network cluster to which the portal node belongs; and f.) discarding information packets received by the portal node via the at least one link, when the information packets do not comprise detection packets.

According to the fourth aspect, the detection packet can comprise a VRBP frame. Nodes other than the portal nodes can be configured to process the VRBP frames as broadcast or multicast packets. The VRBP frame can include frame identity information configured to identify the detection packet as the VRBP frame, and network cluster identity information configured to identify the network cluster of the portal node transmitting the VRBP frame. The method can include the step of: g.) utilizing the network cluster identity information by the portal node receiving the VRBP frame to determine whether the VRBP frame corresponds to the network cluster to which the portal node receiving the VRBP frame belongs. The network cluster identity information can identify a RSTP instance of the portal node transmitting the VRBP frame. The VRBP frame can include version information for identifying a version of the VRBP. The version information can include a major version number and a minor version number. The method can include the step of: h.) discarding the VRBP frame received by the portal node, when the major version number contained in the VRBP frame does not match the major version number of the VRBP utilized by the portal node receiving the VRBP frame.

According to the fourth aspect, the VRBP frame can include virtual root bridge parameter information configured to specify virtual root bridge parameters associated with the portal node transmitting the VRBP frame. The VRBP frame can include address information configured to identify an interface on the portal node transmitting the VRBP frame. The method can include the step of: i.) mutually agreeing upon the virtual root bridge parameters to be used by the portal nodes within the network cluster. The virtual root bridge parameters contained in the VRBP frame having a lowest value of the address information can be used by the portal nodes within the network cluster. The VRBP frame can include time length information configured to specify a length of time between transmission of VRBP frames. According to an exemplary embodiment of the fourth aspect, each network cluster can comprise a RSTP instance. The network can comprise a mesh network, such as, for example, a wireless mesh network or the like. Step (a) can comprise the step of: a1.) arranging the plurality of network clusters in a hierarchical configuration.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Exemplary embodiments of the present invention are directed to a virtual root bridge protocol ("VRBP") for use in networks, such as, for example, mesh networks or the like. According to exemplary embodiments, the VRBP can support redundant links between two or more network clusters or instances of the network. A single Layer 2 network (of the Open System Interconnection (OSI) Model) can be subdivided into several network clusters or "instances," with each instance comprised of several nodes. For example, if the Rapid Spanning Tree Protocol (RSTP) or the like is used for the path selection algorithm for the network, then each network cluster can be a RSTP instance. An inter-instance link occurs where links cross the boundary of a network cluster, such as a RSTP instance, while nodes with such links are referred to herein as "portal nodes."

If there are redundant inter-instance links between, for example, two RSTP instances, then a loop can exist that may not be detected by RSTP or other path selection or forwarding algorithm. To prevent such an occurrence, a virtual root bridge is used according to exemplary embodiments. A virtual root bridge is a fiction that is maintained by the portal nodes. For purposes of illustration and not limitation, assume that there are two portal nodes in a network cluster, such as a RSTP instance. By sending special multicast packets—VRBP frames—each of those portal nodes can detect the existence of the other. Each portal node can transmit Bridge Protocol Data Units (BPDUs) on their other (i.e., the non inter-instance) links advertising that the portal node is one or a few hops away from the virtual root bridge. The two portal nodes advertise the same information (virtual root bridge priority, MAC address and the like) for the same (fictitious) virtual root bridge in the RSTP instance. Each other node in the cluster or instance runs standard RSTP and is unaware that the virtual root bridge is fictitious. The result of advertising such a (fictitious) virtual root bridge is that the spanning tree in, for example, the RSTP instance bifurcates, with one branch going to one portal node and the other branch going to the other portal node. Such bifurcation ensures that there are no loops created by the redundant inter-instance links. Although illustrated with two redundant connections, exemplary embodiments can be generalized to more than two redundant connections.

To implement such virtual root bridges according to exemplary embodiments, each portal node that has an inter-instance link can send out on that link the VRBP frames that allow each portal node to detect the existence of other portal nodes on the same network cluster, such as, for example, a RSTP instance. The VRBP frames can include information that allows the portal nodes to identify the packet as a VRBP frame. The VRBP frame can further include information that can identify the RSTP instance so that the recipient can determine whether the VRBP frame corresponds to an instance to which the recipient belongs. The VRBP frames can also include information for the portal nodes to determine the consensus parameters to be used for the virtual root bridge. By detecting the existence of other portal nodes on the same network cluster, such as a RSTP instance, using the VRBP frames, exemplary embodiments of the present invention can prevent the creation of loops by redundant inter-instance links.

Figure 3:
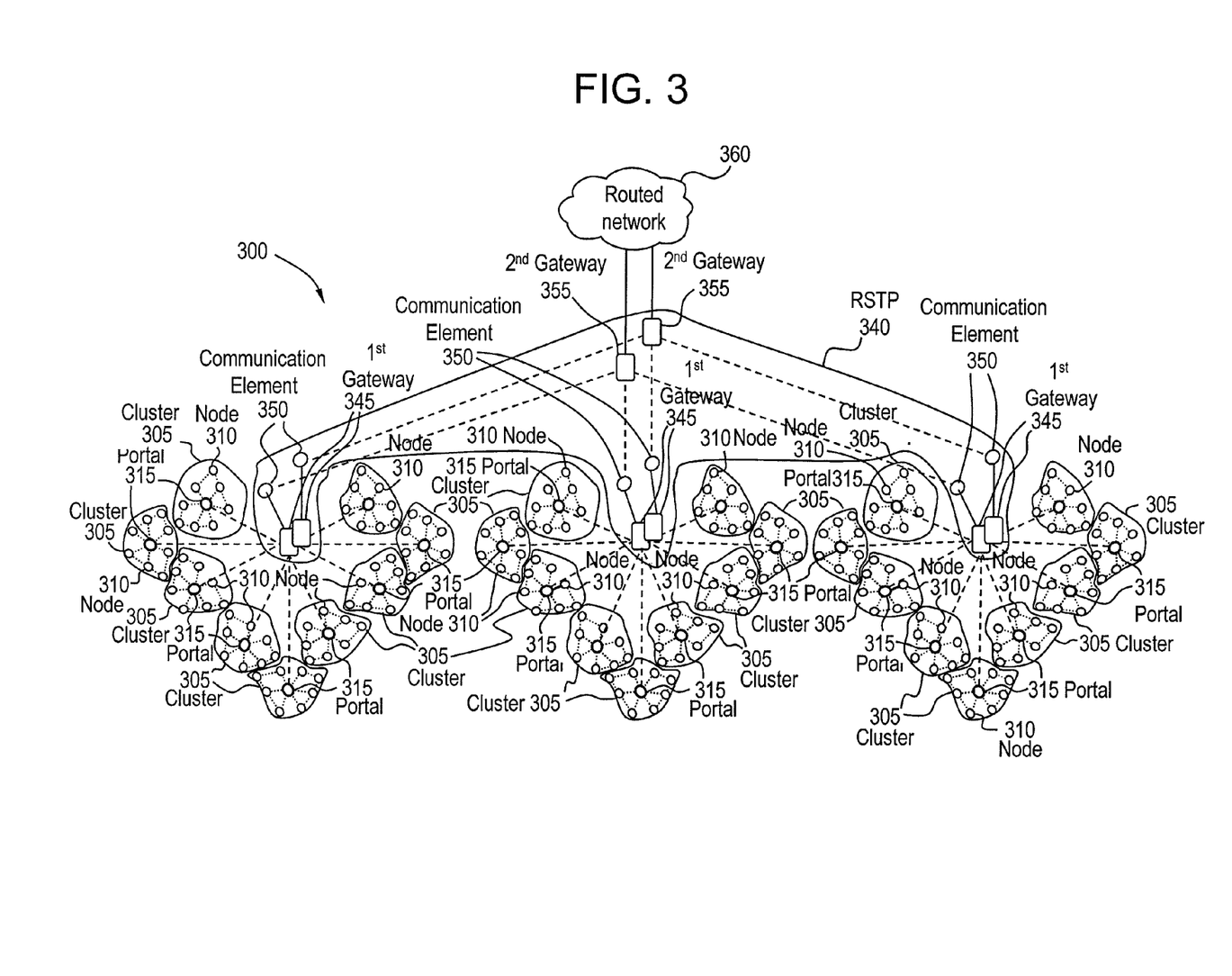
FIG. 3 is a diagram illustrating network, in accordance with an exemplary embodiment of the present invention.

These and other aspects of the present invention will now be described in greater detail. FIG. 3 is a diagram illustrating network 300, in accordance with an exemplary embodiment of the present invention. The network 300 can comprise any suitable type of network, such as, for example, any suitable type of wired or wireless network. According to an exemplary embodiment, the network 300 can comprise a mesh network, such as, for example, a wireless mesh network or the like. Additionally, any suitable type of path selection or forwarding algorithm or networking or routing protocol can be used for the network 300, such as, for example, RSTP, Spanning Tree Protocol (STP) or the like.

The network 300 includes a plurality of network instances or clusters 305. The network 300 can include any suitable number of network clusters 305. According to an exemplary embodiment, if RSTP is used for the path selection algorithm, then each network cluster 305 can comprise a RSTP instance, although the type of "instance" will depend on the path selection algorithm used. Each network cluster 305 includes a plurality of nodes 310. Each network cluster 305 can include any suitable number of nodes 310. At least one of the plurality of nodes 310 comprises a portal node 315. As used herein, a portal node 315 is a node with at least one link (referred to as an inter-instance link) that crosses the boundary of the network cluster 305.

For example, the network cluster 305 can include at least two portal nodes 315, with each of the at least two portal nodes 315 including at least one inter-instance link with a second network cluster 305. In such a configuration, the redundant links between the two network clusters 305 can create a loop that may not be detected by the path selection algorithm, such as, for example, RSTP or the like. Accordingly, each portal node 315 is configured to communicate detection packets for detecting the existence of other portal nodes 315 within the network cluster 305. The detection packets are communicated by the portal nodes 315 on their corresponding inter-instance links. Each portal node 315 is configured to communicate with nodes 310 within the network cluster 305 associated with the respective portal node 310 to indicate that the respective portal node 310 is a predetermined number of hops away from a virtual root bridge associated with the network cluster 305. According to an exemplary embodiment, the portal node 315 can indicate that it is one hop away from the virtual root bridge, although any suitable number of hops can be so indicated. Thus, each portal node 315 is configured to communicate BPDUs on links other than the inter-instance links to advertise that the portal node 315 is one or suitably few hops away from the (fictitious) virtual root bridge. According to an exemplary embodiment, the result of advertising such a (fictitious) virtual root bridge is that the spanning tree in the network cluster 305, such as, for example, an RSTP instance, bifurcates, with one branch going to each portal node 315. Such a bifurcation ensures that there are no loops created by the redundant inter-instance links.

Exemplary embodiments can support any suitable number of portal nodes 315 within a network cluster 305 with any suitable number of redundant links to another network cluster 305. The spanning tree in the network cluster 305 would then divide according to the number of redundant (inter-instance) links in the network cluster 305, with each branch in the spanning tree going to each portal node 315, thereby ensuring that no loops are created by the redundant (inter-instance) links.

According to exemplary embodiments, the nodes 310 other than the portal nodes 315 within the network cluster 305 are configured to run a conventional path selection algorithm, such as, for example, RSTP or the like. However, the conventional path selection algorithm, such as, for example, RSTP or the like, is not run or otherwise utilized by each portal node 315 for communicating detection packets on the at least one inter-instance link. In other words, each portal node 315 is configured to communicate detection packets on each interface of the portal node 315 that is not part of the network cluster 305 to which the portal node 315 belongs. In addition, each portal node 315 is configured to discard information packets received via the inter-instance link(s) when the received information packets are not detection packets. In other words, any BPDUs that are received on an inter-instance link are discarded by the portal node 315. Additionally, BPDUs are not transmitted on the inter-instance links by the portal nodes 315. Thus, the portal nodes 315 can be configured as edge ports or the like, and receipt of any BPDUs on the inter-instance links will not change the port type from edge port. Furthermore, if the portal node 315 includes two or more links that cross the boundary of the network cluster 305, the portal node 315 can be configured to select one of the two or more links as an active link for communicating detection packets, while the other (inactive) links are not used to carry data traffic. If the active link fails, then another link can be activated. However, if the previously failed link becomes available again, that link can, if desired, become the active link again.

According to exemplary embodiments, the detection packet comprises a VRBP frame. The VRBP frames are used by the portal nodes 315 to detect the existence of other portal nodes 315 in the same network cluster 305, as discussed previously. However, the nodes 310 other than the portal nodes 315 are configured to process the VRBP frames as, for example, broadcast packets, multicast packets or the like. According to exemplary embodiments, the information within the VRBP frame can allow another portal node 315 to do the following, for example: identify the packet as a VRBP frame; identify the network cluster 305 (e.g., the RSTP instance) so that the recipient can determine whether the VRBP corresponds to an instance to which the recipient belongs; identify the VRBP version; and identify the virtual root bridge parameters as configured on the sending portal node 315.

Figure 4:
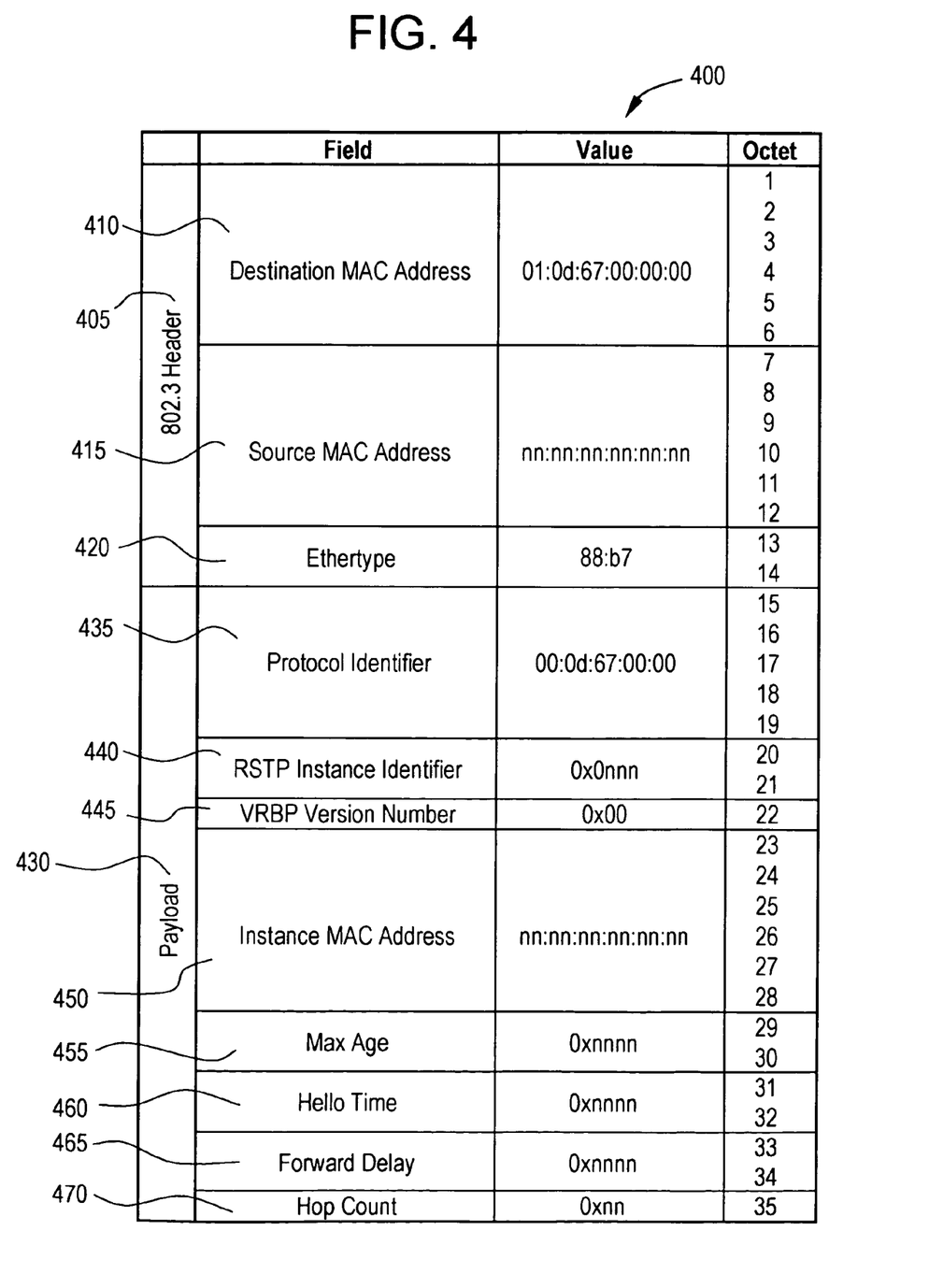
FIG. 4 is a diagram illustrating a Virtual Root Bridge Protocol frame, in accordance with an exemplary embodiment of the present invention.

More particularly, FIG. 4 is a diagram illustrating a VRBP frame 400, in accordance with an exemplary embodiment of the present invention. The VRBP frame 400 includes a header 405 and a payload 430. The VRBP frame 400 can also include appropriate padding and frame check sequence (FCS) that are generated by, for example, the hardware sending the VRBP frame 400, and will depend on, for example, the transmission protocol used. The VRBP frame 400 can comprise, for example, an I.E.E.E. 802.3 frame or the like. For the header 405, the VRBP frame 400 includes a destination address field 410, which can be six octets or any appropriate size. The destination address can be set to a particular address to identify the packet as a VRBP frame 400. In other words, the destination address field 410 can comprise frame identity information that can be configured to identify the (detection) packet as the VRBP frame 400. According to an exemplary embodiment, the destination address field 410 can be set to, for example, an appropriate multicast address dedicated to VRBP. Any suitable address or identifying information can be used for the field.

The VRBP frame 400 includes a source address field 415, which can be six octets or any appropriate size. The source address field 415 can be set to the address (e.g., the MAC address) of the sending interface, such as the address of the interface of the portal node 315 sending the VRBP frame 400. The VRBP frame 400 can include a length/type (Ethertype) field 420, which can be two octets or any appropriate size. The Ethertype field 420 can be set to any suitable value. According to an exemplary embodiment, the Ethertype field 420 can be set to the value 88:b7, although any appropriate value can be used. For example, the value of 88:b7 is defined by the I.E.E.E. 802a-2003 standard as "OUI Extended Ethertype," and is used to indicate a vendor-specific protocol. If "OUI Extended Ethertype" is used for the Ethertype field 420, then a five-octet protocol identifier field can form the first part of the payload 430.

For the payload 430, the VRBP frame 400 can include a protocol identifier field 435, which can be five octets or any appropriate size. The protocol identifier field 435 can detail the vendor-specific protocol in use. For example, if the "OUI Extended Ethertype" is used, then the first five octets of the payload 430 can comprise the protocol identifier field 435. According to an exemplary embodiment, the protocol identifier field 435 can be set to a multicast address dedicated to VRBP, in which any suitable value for the multicast address can be used.

The VRBP frame 400 includes an instance identifier field 440, which can be two octets or any appropriate size. The instance identifier field 440 can comprise network cluster identity information that is configured to identify the network cluster 305 of the portal node 315 transmitting the VRBP frame 400. According to exemplary embodiments, the portal node 315 receiving the VRBP frame 400 can utilize such network cluster identity information to determine whether the VRBP frame 400 corresponds to the network cluster 305 to which the portal node 315 receiving the VRBP frame 400 belongs. According to an exemplary embodiment, the network cluster identity information can be configured to identify, for example, a RSTP instance of the portal node 315 transmitting the VRBP frame 400. In other words, the instance identifier field 440 can used to uniquely identify each instance of, for example, RSTP within, for example, a Layer 2 network. According to an exemplary embodiment, the high-order four bits of the instance identifier field 440 can be set to zero, i.e., the instance identifier field 440 can be a 12-bit value that is padded on the left with zeroes. A 12-bit value can be used to maintain compatibility with the System ID portion of the RSTP bridge identifier, which is used by the Multiple Spanning Tree Protocol (MSTP) to identify different instances. When comparing instance identifiers, the most-significant four bits can then be ignored. However, the instance identifier field 440 can be any suitable value or other unique identifier of any suitable size or length.

The VRBP frame 400 includes a VRBP version number field 445, which can be one octet or any appropriate size. The VRBP version number field 445 can include version information that is configured to identify the version of the VRBP being used. For example, the VRBP version number field 445 can include a major version number subfield (e.g., the most significant four bits) and a minor version number subfield (e.g., the least significant four bits). According to exemplary embodiments, the portal node 315 receiving the VRBP frame 400 can be configured to discard the VRBP frame 400 when the major version number contained in the VRBP version number field 445 does not match the major version number of the VRBP utilized by the portal node 315 receiving the VRBP frame 400. For example, if a portal node 315 receives a VRBP frame 400 where the instance identifier field 440 matches that on the portal node 315, but the major version number does not, then the portal node 315 can ignore the VRBP frame 400 (e.g., except for generating a log message and/or alarm or the like). However, if the major version number matches, but the minor version number does not, then the portal node 315 can use the VRBP frame 400. In such a case, the VRBP frame 400 may contain new fields not understood by the portal node 315, but the different (minor) versions would be known to interwork properly.

The VRBP frame 400 includes an instance address field 450, which can be six octets or any appropriate size. The instance address field 450 includes the address (e.g., the MAC address) of an interface on the sending portal node 315 that is connected to the network cluster 305 (e.g., the RSTP instance) on which the VRBP frame 400 is received. Thus, the instance address field 450 can be configured to identify the interface on the portal node 315 transmitting the VRBP frame 400. If the sending portal node 315 has more than one such instance address, then the portal node 315 can choose any one of the addresses. However, according to an exemplary embodiment, the portal node 315 should continually choose the same instance address, even across restarts.

The VRBP frame 400 includes a message age field 455, which can be two octets or any appropriate size. The message age field 455 can carry the value of the maximum message age or expiration time for VRBP frames 400 forwarded in the network 300 (e.g., based on the path selection or forwarding algorithm used), as configured on the sending portal node 315. Thus, the message age value can comprise the period of time after which information on the root bridge expires, and any information older than the message age value can be discarded. For example, the message age field 455 can carry the RSTP message age parameter MaxAge, as configured on the sending portal node 315. In other words, the value sent is that which is configured on the sending portal node 315, not necessarily the value that may be currently in use. The message age can be any suitable expiration value.

The VRBP frame 400 includes a hello time field 460, which can be two octets or any appropriate size. The hello time field 460 can carry time length information that is configured to specify the length of time between transmission of VRBP frames 400. For example, the hello time field 460 can carry the value of the RSTP HelloTime parameter, as configured on the sending portal node 315.

The VRBP frame 400 includes a forward delay field 465, which can be two octets or any appropriate size. The forward delay field 465 can carry a value representing the length of time a portal node 315 spends before forwarding a VRBP frame 400, as configured on the sending portal node 315. For example, the forward delay value can act as a timer or the like to give the portal node 315 a suitable amount of time to "listen" to and "learn" about traffic being passed on the network 300 before participating in such data traffic forwarding. For example, according to an exemplary embodiment, the forward delay field 465 can carry the RSTP forward delay parameter, as configured on the sending portal node 315.

The VRBP frame 400 can include a hop count field 470, which can be one octet or any appropriate size. The hop count value carried by the hop count field 470 can specify the number of inter-instance links that the VRBP frame 400 has traversed. For example, according to an exemplary embodiment, the VRBP frame 400 can be discarded if forwarding the VRBP frame 400 can cause the incremented value of the hop count field to exceed a configurable and suitable "Max Hop Count" value or the like.

According to exemplary embodiments, at least the message age field 455, the hello time field 460 and the forward delay field 465 can comprise the virtual root bridge parameter information that is configured to specify the virtual root bridge parameters associated with the portal node 315 transmitting the VRBP frame 400. For example, each portal node 315 in a network cluster 305 can have certain virtual root bridge parameters configured on it. The virtual root bridge parameters of the portal node 315 are used if that portal node 315 is selected as the (virtual) root bridge, while the other nodes 310 in the network cluster 305 can learn and use those values from the BPDUs. Because exemplary embodiments of the present invention use a virtual root bridge, the various portal nodes 315 within a network cluster 305 can mutually agree upon the virtual root bridge parameters to be used by the portal nodes 315 within the network cluster 305. Any suitable mechanism for reaching such mutual agreement can be used. For example, according to an exemplary embodiment, the virtual root bridge parameters contained in the VRBP frame 400 having the numerically lowest value in the instance address field 450 can be used by the portal nodes 315 within the network cluster 305. Once agreed upon, each portal node 315 within the network cluster 305 can use those virtual root bridge parameters for their VRBP frames 400.

As discussed previously, any node 310 with an active interface that is not part of a network cluster 305 defined elsewhere on the node 310 is considered a portal node 315. According to exemplary embodiments, as soon as a portal node 315 has identified itself as such, the portal node 315 can start sending VRBP frames 400 on each interface that is not part of the network cluster 305. Once a node 310 has determined that it is to send VRBP frames 400 as a portal node 315, the VRBP frames 400 can be transmitted periodically, at any suitable interval. For example, the currently-active value of the hello time parameter that is transmitted in the hello time field 460 can be used to determine the spacing of such transmissions.

Additionally, as discussed previously, portal nodes 315 can use VRBP frames 400, while any non-portal nodes 310 can treat the VRBP frames 400 as, for example, multicast frames.

For example, when a portal node 315 receives a VRBP frame 400 (e.g., as identified by the destination address field 410), the portal node 315 can check the Ethertype and protocol identifier fields 420 and 435, respectively. If such fields do not both match the specified, predetermined values (e.g., the exemplary values discussed previously for these fields), then the VRBP frame 400 can be forwarded as a normal multicast frame. If the Ethertype and protocol identifier fields 420 and 435 do match the specified values, then the instance identifier field 440 can be compared to the instance identifiers for network clusters 305 directly connected to the portal node 315. If there is no match, then the hop count field 470 can be examined. If value of the hop count is less than the system-configured Max Hop Count value, then the value in the hop count field 470 can be incremented and the VRBP frame 400 can be forwarded following normal multicast forwarding rules. According to exemplary embodiments, the hop count mechanism can be used to achieve a compromise between scalability and flexibility. To maximize scalability, the VRBP frames 400 should be prevented from spreading through the entire Layer 2 network. However, to maximize flexibility, the VRBP frames 400 can be allowed to span multiple network clusters 305 (e.g., so that network cluster A can have direct links to network clusters C and D, where the latter two clusters may or may not themselves be directly connected).

Assuming that the instance identifier field 440 matches one defined on an interface of the portal node 315, the portal node 315 can next examine the VRBP version number field 445. For example, if the highest four bits (e.g., the major version number) do not match the major version number implemented on the receiving portal node 315, then the VRBP frame 400 can be discarded and suitable warnings (e.g., log messages and the like) can be generated. Otherwise, the portal node 315 can continue. If the portal node 315 has not already enabled virtual root bridge for the network cluster 305, then the portal node 315 can compare the received frame's instance address field 450 to the instance address of the portal node 315. For example, the portal node 315 can use the virtual root bridge parameters values of the numerically lowest instance address in the instance address field 450. The portal node 315 is configured to save the information from the VRBP frame 400 (e.g., in any suitable type of computer memory or storage). However, according to an exemplary embodiment, if the portal node 315 receives VRBP frames 400 from more than one portal node 315 for the same network cluster 305, then the portal node 315 can save the most recent VRBP information from each VRBP frame 400.

According to an exemplary embodiment, if a VRBP frame 400 is older than approximately three (or any suitable number) times the currently active hello time parameter, then the VRBP information associated with that VRBP frame 400 can be deleted. If a new VRBP frame 400 from the same source is received, then the VRBP information can be updated if it has changed, and the timer can be restarted. It is to be noted that once the virtual root bridge parameters of a portal node 315 have been selected for use, those parameters can continue to be used even if the VRBP frame 400 of the original portal node 315 times out. The virtual root bridge parameters can be changed if the current highest priority portal node advertises different values. Such an occurrence can happen in several ways. For example, a new portal node 315 can join the network and advertise different parameter values. Alternatively, the currently highest priority portal node 315 can have its configured virtual root bridge parameter values changed by, for example, network management or a network administrator.

With respect to, for example, RSTP, it is noted that there is a security weakness in RSTP. For example, a client that advertises itself as a high-priority root bridge can disrupt the entire network, because the number of hops to the root bridge would double for some nodes. In other words, a malicious client can advertise itself as having bridge priority of zero and a MAC address of all zeroes, and be substantially guaranteed to be the root bridge. The MAC addresses of the desired root bridge(s) could be altered to make such an attack more difficult, but such an alternation creates problems of its own if the desired root bridge fails. In addition, any client who joins the network can potentially generate RSTP BPDUs and could become part of the network topology. Most seriously, a client device can send BPDUs into the network that advertises itself as a highest-priority root bridge. Other nodes in different zones from the new root bridge would suddenly "see" double the number of hops to the root bridge, which would likely mean that the root bridge information would expire before reaching all parts of the LAN. The resulting LAN would have an unstable topology with bridged loops and broken communications. Thus, RSTP can be insecure: any device capable of sending frames into the network 305 can send BPDUs. For example, a malicious node in the network 305 could generate spurious VRBP frames 400 and cause a misconfiguration.

To address such security issues, exemplary embodiments of the present invention can incorporate suitable security measures into the VRBP. For example, to prevent wireless client devices from generating spurious VRBP frames 400, all access radios can filter out any multicasts to the VRBP address specified in the destination address field 410 (e.g., an appropriate multicast address or other suitable VRBP address). Another source of spurious multicasts can be the core network 305. However, if it is assumed that the core network 305 contains only trusted nodes 310, then such a issue can be minimized. It is noted that direct Layer 2 connectivity can be used to transmit the VRBP frames 400, because the Ethernet multicast address cannot be generated from an IP frame. The VRBP security can also be enhanced by using such security protocols as, for example, IPsec, 802.1x, or any other suitable authentication method.

Exemplary embodiments of the present invention provide for the ability to arrange the network 305 in a hierarchical manner. For example, multiple, layered RSTP instances can be arranged in a hierarchical configuration to provide for greater scalability in such networks. As discussed previously, it is desirable to avoid IP subnet boundaries in, for example, a wireless access network or the like, because such boundaries can break WLAN client mobility. In conventional WLANs, RSTP boundaries, Layer 2 broadcast boundaries, and IP subnet boundaries are the same. As noted previously, RSTP can create an undesirable limitation on the size of an IP subnet, particularly for wireless mesh networks. According to exemplary embodiments, a single Layer 2 network can be subdivided into several RSTP "instances". Thus, a hierarchical approach to, for example, RSTP can be used, as illustrated in FIG. 3. In FIG. 3, the plurality of network clusters 305 can form a "first layer" of an RSTP instance. A second layer 340 RSTP instance can be arranged in a hierarchy "on top of" or "above" the first layer, thereby forming what is referred to herein as a hierarchical RSTP network. According to exemplary embodiments, because the RSTP boundaries no longer coincide with IP subnet boundaries, there is no further need to make the RSTP instances as large as possible. However, it may still be desirable to keep the network clusters 305 relatively small, because recovery times can be faster and RSTP-related problems (e.g., a misconfiguration that can cause an inappropriate node to become a root bridge) can be kept isolated.

To support such a hierarchical RSTP, if RSTP BPDUs "leak" from one instance to another, then the two instances can become one, which could defeat the creation of a hierarchy. To address such a concern, exemplary embodiments of the present invention can conform to certain conventions, including: RSTP BPDUs are not transmitted on inter-instance links; inter-instance links are configured as edge ports; and any BPDUs received on an inter-instance link can be discarded by the portal node 315, and the port type is not changed from an edge port. Such conventions have been discussed previously with regard to the VRBP.

Another issue that can be addressed with hierarchical RSTP is to prevent the creation of loops between instances. Such a concern can be easily addressed if there are no redundant connections between instances. However, redundant connections may be required. To support redundant inter-instance links, exemplary embodiments can use the VRBP and the accompanying VRBP frames as a technique to support load-shared redundant connections without having to run RSTP across those connections. Thus, the portal nodes 315 in the hierarchical RSTP can implement the VRBP. By conforming to the conventions described herein, and by using VRBP, a hierarchical RSTP network, such as network 300, can be used to overcome the scalability issues involved with path selection or forwarding algorithms such as, for example, RSTP or the like.

Although RSTP has been discussed merely to illustrate exemplary embodiments of the present invention, any suitable Layer 2 or Layer 3 path selection or forwarding algorithm or routing or networking protocol can be used according to exemplary embodiments, including, but not limited to, STP, Ad hoc On-Demand Distance Vector (AODV), Open Shortest Path First (OPSF) protocol, Angle-Signal-to-Interference-and-Noise-Ratio (Angle-SINR) Table (AST) routing, Ant-Colony Based Routing Algorithm (ARA), Backup Source Routing (BSR), Distance Routing Effect Algorithm for Mobility (DREAM), Destination-Sequenced Distance Vector (DSDV), Dynamic Source Routing (DSR), Fisheye State Routing (FSR), Global State Routing (GSR), Location-Aided Routing (LAR), Link-Life Based Routing (LBR), Lightweight Mobile Routing (LMR) protocol, Link-State Routing (LSR), Meshed Multipath Routing Protocol (MMRP) with selective forwarding, Optimized Link State Routing (OLSR), Routing Bridges (rBridges), Region-based Routing Protocol (REGR), Terminode routing, Terminode Remote Routing (TRR), Two-Tier Data Dissemination (TTDD), Zone Routing Protocol (ZRP), or the like. For example, according to an exemplary embodiment, RSTP can be used for a Layer 2 forwarding algorithm, while OPSF can be used for a Layer 3 forwarding algorithm.

As discussed previously, the network 300 can comprise any suitable type of network, such as, for example, a mesh network, a wireless mesh network or the like. The nodes 310 can be comprised of any suitable type of client device or element capable of performing the functions for a node as described herein. For example, according to an exemplary embodiment, each node 310 can be comprised of a suitably-configured BelAir50c manufactured by BelAir Networks Inc. of Kanata, Ontario, Canada, or the like. The portal nodes 315 can be comprised of any suitable type of device or element capable of performing the functions for a portal node as described herein. For example, according to an exemplary embodiment, each portal node 315 can be comprised of either a suitably configured BelAir50C or a suitably-configured BelAir100 manufactured by BelAir Networks Inc. or the like. The nodes 310 and portal nodes 315 in each network cluster 305 can communicate with each other using any suitable type of communication link, such as, for example, a Multipoint-to-Multipoint ("M2M") link or the like.

Each of the portal nodes 315 in each of the network clusters 305 in the first layer RSTP instance illustrated in; for example, FIG. 3 can be in communication with the second layer 340 RSTP instance using first gateway elements 345. The first gateway elements 345 can comprise any suitable type of gateway element or device (e.g., a router or the like) that is capable of communicating with and routing information to/from the portal nodes 315, such as, for example, a suitably-configured BelAir200 manufactured by BelAir Networks Inc. or the like. The first gateway elements 345 and portal nodes 315 can communicate with each other using any suitable type of communication link, such as, for example, a Point-to-Multipoint ("P2M") link or the like.

The first gateway elements 345 can, in turn, be in communication with communication elements 350 of the second layer 340 RSTP instance. The communication elements 350 can comprise any suitable type of communication element or device that is capable of communicating with the first gateway elements 345, such as, for example, a suitably-configured BelAir100 or the like. The first gateway elements 345 and the communication elements 350 can communicate with each other using any suitable type of communication link, such as, for example, a wired link or the like. The communication elements 350 can be connected to a routed network 360 (e.g., the Internet or other suitable network) using second gateway elements 355. The second gateway elements 355 can comprise any suitable type of gateway element or device (e.g., a router or the like) that is capable of connecting the second layer 340 RSTP instance (or any other layer of the hierarchical RSTP) to the routed network 360 and communicating and routing information to/from the routed network 360, such as, for example, a BelAir200 or the like. The network communication elements 350 and second gateway elements 355 can communicate with each other using any suitable type of communication link, such as, for example, a Point-to-Point ("P2P") link or the like. The second gateway elements 355 can be in communication with the routed network 360 using any suitable type of communication link, such as, for example, a wired link or the like. Other configurations of the hierarchical RSTP and the network 300 can be used.

For example, for a RSTP mesh network, the mesh network can be comprised of a collection of infrastructure nodes. The wireless clients (e.g., the nodes 310) can establish non-mesh connections to the infrastructure nodes (APs). Furthermore, access radios in such a mesh can operate in a hybrid mode, where they are infrastructure APs to the wireless clients, but are stations with respect to the mesh network. The mesh network can carry traffic that is, generally, between wireless clients at the edge of the network and a few gateway routers located towards the core of the network. Consequently, such a mesh network can be hierarchical in nature, as discussed previously. In addition, such a mesh architecture can be substantially static in nature. In other words, there can be a relatively fixed number of nodes in a given mesh, and the nodes can tend to stay in the mesh for long periods of time. Such a mesh network can be preconfigured.

In addition, the mesh nodes can be substantially stationary. In other words, although links can come and go depending on the radio environment, the nodes themselves do not move. In accordance with exemplary embodiments, by supporting and utilizing VRBP and the hierarchical RSTP architecture, such mesh networks can be very large, with a total of thousands of mesh nodes or more. The mesh network can be subdivided hierarchically, because the mesh network can be preconfigured as necessary. Furthermore, such a mesh network can use, for example, pre-shared keys as a form of security.

With respect to robustness, the greatest weakness of algorithms such as, for example, RSTP is the selection of a root bridge. If different nodes select different root bridges, then their forwarding tables will not be consistent with one another. Loops and broadcast storms are the likely result. Conservative network design practice can help. For example, the maximum number of hops from the root bridge to any other bridge in the network can be limited, taking into account possible failures of the root bridge, other bridges, or various links. In addition, carefully configuring bridge priorities to control the election of the root bridge, and to enforce an appropriate chain of succession if the root bridge is unavailable. Another robustness concern with, for example, RSTP is a bridged network's vulnerability to broadcast storms whenever a loop is present. RSTP and other like algorithms are intended to prevent loops, but there are scenarios where loops can occur. For example, a client device could bridge between two segments, but not generate any BPDUs. In such a scenario, the loop can exist indefinitely. Even if the client does generate a BPDU, there may be a period of a several seconds or more while the links are bridged, but a BPDU has not yet been sent. During that time, a broadcast storm can ramp up to the point that it may take many attempts before a BPDU is received. As discussed previously, the VRBP and the accompanying VRBP frames can be used to support redundant inter-instance links, manage such loops and address such issues with root bridges.

Figure 5:
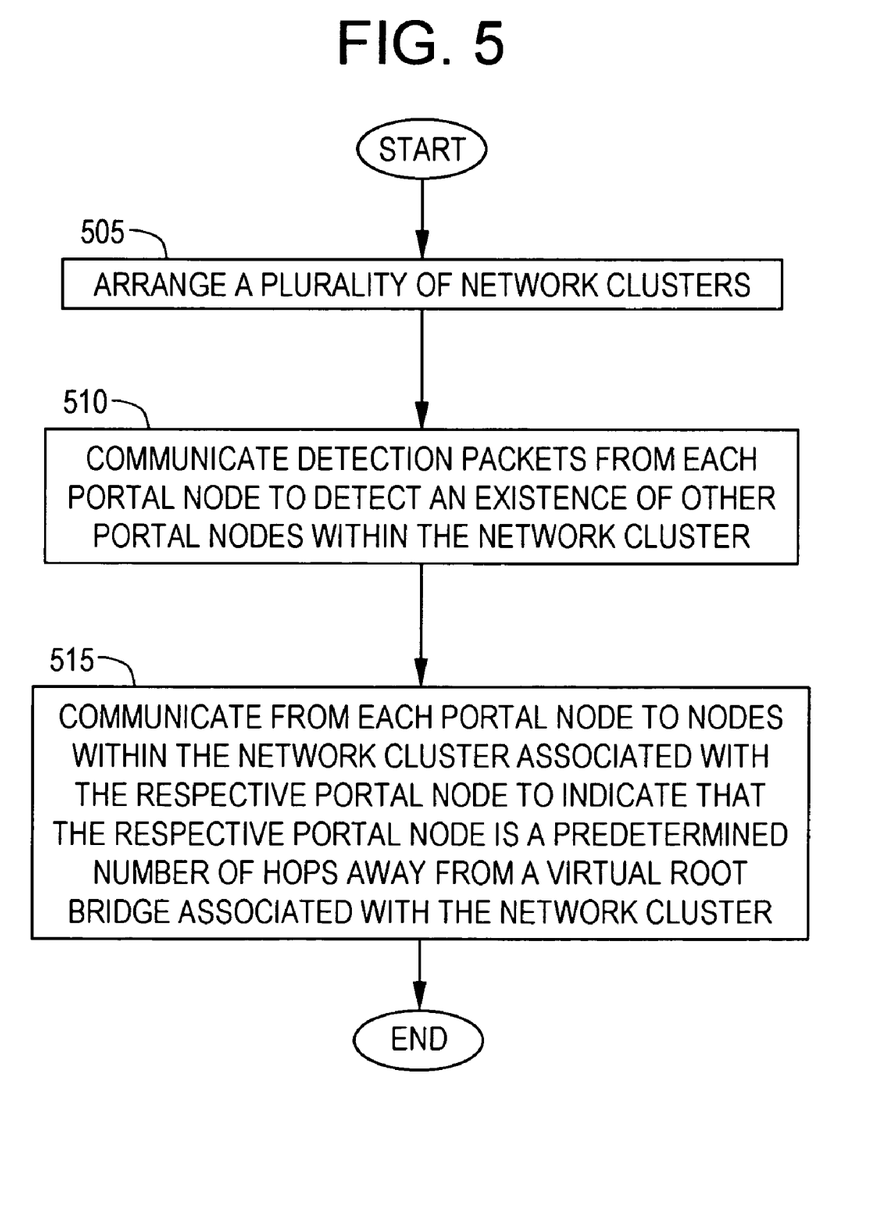
FIG. 5 is a flowchart illustrating steps for networking, in accordance with an exemplary embodiment of the present invention.

FIG. 5 is a flowchart illustrating steps for networking, in accordance with an exemplary embodiment of the present invention. In step 505, a plurality of network clusters are arranged. For example, the plurality of network clusters can be arranged in a hierarchical configuration or the like. Each network cluster can include a plurality of nodes. At least one of the plurality of nodes comprises a portal node. A portal node comprises a node with at least one link that crosses a boundary of the network cluster. In step 510, detection packets are communicated from each portal node to detect an existence of other portal nodes within the network cluster. In step 515, each portal node communicates to nodes within the network cluster associated with the respective portal node to indicate that the respective portal node is a predetermined number of hops away from a virtual root bridge associated with the network cluster.

The network cluster can include at least two portal nodes, and each of the at least two portal nodes can include at least one link with a second network cluster. One of at least two links can be selected as an active link for communicating detection packets when the portal node includes at least two links that cross the boundary of the network cluster. Nodes within the network cluster other than the portal nodes can be configured to utilize RSTP or the like. However, the RSTP is not utilized by each portal node for the at least one link. Detection packets can be communicated on each interface of the portal node that is not part of the network cluster to which the portal node belongs. Information packets received by the portal node via the at least one link can be discarded when the information packets do not comprise detection packets.

The detection packet can comprise a VRBP frame. Nodes other than the portal nodes can be configured to process the VRBP frames as broadcast packets, multicast packets or the like. The VRBP frame can include frame identity information configured to identify the detection packet as the VRBP frame, and network cluster identity information configured to identify the network cluster of the portal node transmitting the VRBP frame. The network cluster identity information can be utilized by the portal node receiving the VRBP frame to determine whether the VRBP frame corresponds to the network cluster to which the portal node receiving the VRBP frame belongs. The network cluster identity information can identify a RSTP instance of the portal node transmitting the VRBP frame. The VRBP frame can include version information for identifying a version of the VRBP. The version information can include a major version number and a minor version number. The VRBP frame received by the portal node can be discarded when the major version number contained in the VRBP frame does not match the major version number of the VRBP utilized by the portal node receiving the VRBP frame.

The VRBP frame can include virtual root bridge parameter information configured to specify virtual root bridge parameters associated with the portal node transmitting the VRBP frame. The VRBP frame can include address information configured to identify an interface on the portal node transmitting the VRBP frame. The virtual root bridge parameters to be used by the portal nodes within the network cluster can be mutually agreed upon by those portal nodes. For example, the virtual root bridge parameters contained in the VRBP frame having a lowest value of the address information can be used by the portal nodes within the network cluster. The VRBP frame can include time length information configured to specify a length of time between transmission of VRBP frames. According to an exemplary embodiment, each network cluster can comprise, for example, a RSTP instance.

The steps of a computer program as illustrated in FIG. 5 for networking and the data structure of the VRBP frame 400 illustrated in FIG. 4 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

All United States patents and applications, foreign patents, and publications discussed above are hereby incorporated herein by reference in their entireties.

What is claimed is:

1. A network, comprising:
    a plurality of network clusters, wherein the each of the respective network clusters includes a plurality of nodes, wherein the plurality of nodes includes a first portal node and a second portal node, wherein the each of the portal nodes comprises at least one inter-cluster link that crosses a boundary of the respective network cluster, wherein the each of the portal nodes is configured to communicate detection packets for (i) detecting an existence of an other portal node within the respective network cluster and (ii) creating a virtual root bridge associated with the respective network cluster using information contained within the communicated detection packets, the inter-cluster links of the first and second portal nodes capable of forming redundant inter-cluster loops, and
    wherein said each portal node is configured to communicate with other nodes within the respective network cluster associated with said each portal node to indicate that the said each portal node is a predetermined number of hops away from the virtual root bridge associated with the respective network cluster; and
    wherein a path-selection protocol used by the other nodes within each respective network cluster bifurcates network topology with one branch to the first portal node and a second branch to the second portal node, eliminating the redundant inter-cluster loops.

2. The network of claim 1, wherein when the first portal node comprises at least two inter-cluster links that cross the boundary of the respective network cluster, and wherein the first portal node is configured to select one of the at least two inter-cluster links as an active link for communicating the detection packets.

3. The network of claim 1, wherein the nodes within the respective network cluster other than the first portal node and the second portal node are configured to utilize Rapid Spanning Tree Protocol (RSTP), and wherein the RSTP is not utilized by the first portal node for a corresponding inter-cluster link.

4. The network of claim 1, wherein the first portal node is configured to communicate the detection packets on each interface of the first portal node that is not part of the respective network cluster to which the first portal node belongs.

5. The network of claim 1, wherein the first portal node is configured to discard information packets received via the inter-cluster link when the information packets do not comprise the detection packets.

6. The network of claim 1, wherein at least one of the communicated detection packets comprises a Virtual Root Bridge Protocol (VRBP) frame.

7. The network of claim 6, wherein at least two nodes of the respective cluster other than the first portal node are configured to process the VRBP frames as one of broadcast and multicast packets.

8. The network of claim 6, wherein the VRBP frame comprises:
    frame identity information configured to identify the at least one of the communicated detection packets as the VRBP frame; and
    network cluster identity information configured to identify the respective network cluster of the first portal node transmitting the VRBP frame,
    wherein another portal node receiving the VRBP frame utilizes the network cluster identity information to determine whether the VRBP frame corresponds to a second respective network cluster to which the another portal node belongs.

9. The network of claim 8, wherein the network cluster identity information is configured to identify a RSTP instance of the first portal node transmitting the VRBP frame.

10. The network of claim 6, wherein the VRBP frame comprises version information configured to identify a version of the VRBP.

11. The network of claim 10, wherein the version information comprises a major version number and a minor version number.

12. The network of claim 11, wherein another portal node receiving the VRBP frame is configured to discard the VRBP frame when the major version number contained in the VRBP frame does not match the major version number of the VRBP utilized by the another portal node receiving the VRBP frame.

13. The network of claim 6, wherein the VRBP frame comprises virtual root bridge parameter information configured to specify virtual root bridge parameters associated with the first portal node transmitting the VRBP frame.

14. The network of claim 13, wherein the VRBP frame comprises address information configured to identify an interface on the first portal node transmitting the VRBP frame.

15. The network of claim 14, wherein each of the at least first and second portal nodes within a respective network cluster is configured to mutually agree upon the virtual root bridge parameters to be used by any of the portal nodes within the respective network cluster.

16. The network of claim 15, wherein the virtual root bridge parameters contained in the VRBP frame having a lowest value of the address information are used by each of the first and second portal nodes within the respective network cluster.

17. The network of claim 6, wherein the VRBP frame comprises time length information configured to specify a length of time between transmission of VRBP frames.

18. The network of claim 1, wherein the each of the respective network clusters comprises a Rapid Spanning Tree Protocol (RSTP) instance.

19. The network of claim 1, wherein the network comprises a mesh network.

20. The network of claim 19, wherein the mesh network comprises a wireless mesh network.

21. A method of networking, comprising the steps of:
arranging a plurality of network clusters, wherein each respective network cluster includes a plurality of nodes, wherein the plurality of nodes comprises a first portal node and a second portal node, wherein the first portal node has a first link that crosses a boundary of the respective network cluster, and wherein the second portal node has a second link that crosses the boundary of the respective network cluster;
communicating detection packets from the first portal node to detect an existence of other portal nodes within the respective network cluster;
creating a virtual root bridge associated with the respective network cluster using information contained within the communicated detection packets, the first and second portal nodes capable of forming redundant loops of inter-cluster links;
communicating from the first portal node to the plurality of nodes within the respective network cluster associated with the first portal node to indicate that the first portal node is a predetermined number of hops away from the virtual root bridge associated with the respective network cluster; and
using a path-selection protocol by other nodes within the each of the respective network clusters to bifurcate network topology with one branch to the first portal node and a second branch to the second portal node, eliminating the loops created by redundant inter-cluster links.

22. The method of claim 21, comprising the step of:
when the first portal node includes two links that cross the boundary of the respective network cluster, selecting one of the two links as an active link for communicating the detection packets.

23. The method of claim 21, comprising the step of:
communicating the detection packets on each interface of the first portal node that is not part of the respective network cluster to which the first portal node belongs.

24. The method of claim 21, comprising the step of:
discarding information packets received by the first portal node via the first link, when the information packets do not comprise the detection packets.

25. The method of claim 21, wherein at least one of the communicated detection packets comprises a Virtual Root Bridge Protocol (VRBP) frame.

26. The method of claim 25, wherein the VRBP frame includes frame identity information configured to identify the at least one of the communicated detection packets as the VRBP frame, and network cluster identity information configured to identify the respective network cluster of a portal node transmitting the VRBP frame, and wherein the method comprises the step of:
utilizing the network cluster identity information by the portal node receiving the VRBP frame to determine whether the VRBP frame corresponds to a second respective network cluster to which the portal node receiving the VRBP frame belongs.

27. The method of claim 21, wherein the arranging step comprises the step of arranging the plurality of network clusters in a hierarchical configuration.

28. A non-transitory computer-readable medium having a Virtual Root Bridge Protocol (VRBP) data structure for detection packets, comprising:
version information configured to identify a version of the VRBP;
frame identity information configured to identify at least one of the detection packets as a VRBP frame; and
network cluster identity information configured to identify a first respective network cluster of a first portal node transmitting the VRBP frame, wherein a second portal node receiving the VRBP frame utilizes the network cluster identity information to determine whether the VRBP frame corresponds to a second respective network cluster to which the second portal node receiving the VRBP frame belongs; and
virtual root bridge parameter information configured to specify virtual root bridge parameters associated with the first portal node transmitting the VRBP frame, wherein the first portal node is configured to create at least a first virtual root bridge using the virtual root bridge parameter information, the first and second portal nodes capable of forming redundant inter-cluster loops, and wherein a path-selection protocol used by other nodes within each respective network cluster bifurcates network topology with one branch to the first portal node and a second branch to the second portal node, eliminating the redundant inter-cluster loops.

29. The computer-readable medium of claim 28, wherein the network cluster identity information is configured to identify a RSTP instance of the first portal node transmitting the VRBP frame.

30. The computer-readable medium of claim 28, wherein the version information comprises a major version number and a minor version number.

31. The computer-readable medium of claim 30, wherein the second portal node receiving the VRBP frame is configured to discard the VRBP frame when the major version number contained in the VRBP frame does not match the major version number of the VRBP utilized by the second portal node receiving the VRBP frame.

32. The computer-readable medium of claim 28, comprising address information configured to identify an interface on the first portal node transmitting the VRBP frame.

33. The computer-readable medium of claim 32, wherein, when the first respective network cluster includes at least two portal nodes, the at least two portal nodes are configured to mutually agree upon the virtual root bridge parameters to be used by any of the portal nodes within the first respective network cluster.

34. The computer-readable medium of claim 33, wherein the virtual root bridge parameters contained in the VRBP frame having a lowest value of the address information are used by the at least two portal nodes within the first respective network cluster.

35. The computer-readable medium of claim 28, further comprising time length information configured to specify a length of time between transmission of VRBP frames.

36. The network of claim 18, wherein the plurality of network clusters includes at least a first RSTP instance and a second RSTP instance, wherein the at least first and second RSTP instances are arranged in a hierarchical configuration, and wherein the first RSTP instance is isolated from the second RSTP instance by a first virtual root bridge.

37. The network of claim 1, wherein the first portal node and the second portal node are redundant portal nodes.

38. The network of claim 1, wherein each first portal node is configured to communicate the detection packets across an inter-cluster link.

\* \* \* \* \*